United States Patent [19]

Angus et al.

[11] 3,978,811
[45] Sept. 7, 1976

[54] TROLLING DEVICE WITH PARAMETER DETECTING MEANS FOR CONTROLLING THE DEVICE

[76] Inventors: Charles D. Angus, 302 N. Buchanan St., Spring Lake, Mich. 49456; John C. Angus, 2716 Colchester Road, Cleveland, Ohio 44106

[22] Filed: Mar. 17, 1975

[21] Appl. No.: 559,136

[52] U.S. Cl. .............................. 114/235 B; 43/42.03; 43/43.13; 340/3 T
[51] Int. Cl.² .................................... B63B 21/00
[58] Field of Search ................... 114/235 B, 25; 43/42.22, 43.13, 43.14, 42.03, 42.14; 73/170 A; 340/3 T

[56] References Cited
UNITED STATES PATENTS

| | | | |
|---|---|---|---|
| 2,679,227 | 5/1954 | Symonds | 114/235 B |
| 2,976,642 | 3/1961 | Wickman et al. | 43/43.13 |
| 3,470,649 | 10/1969 | Cole | 43/43.13 |
| 3,491,476 | 1/1970 | McLendon | 43/42.14 |
| 3,677,278 | 7/1972 | Joynes | 114/235 B |
| 3,749,045 | 7/1973 | Angus et al. | 114/235 B |
| 3,796,000 | 3/1974 | Nye | 43/43.13 |

*Primary Examiner*—Duane A. Reger
*Assistant Examiner*—Charles E. Frankfort
*Attorney, Agent, or Firm*—Price, Heneveld, Huizenga & Cooper

[57] ABSTRACT

A trolling device for movement through a fluid includes a movable element and control apparatus for selectively stopping the movable element to control the movement of the trolling device through a fluid according to a detected physical parameter. In one embodiment, the movable element comprises a paddle wheel and the control apparatus includes a bellows which stops the wheel causing the device to dive when trolled through a fluid such as water above a predetermined depth. When below a predetermined depth, the wheel is allowed to freewheel permitting the device to ascend.

17 Claims, 8 Drawing Figures

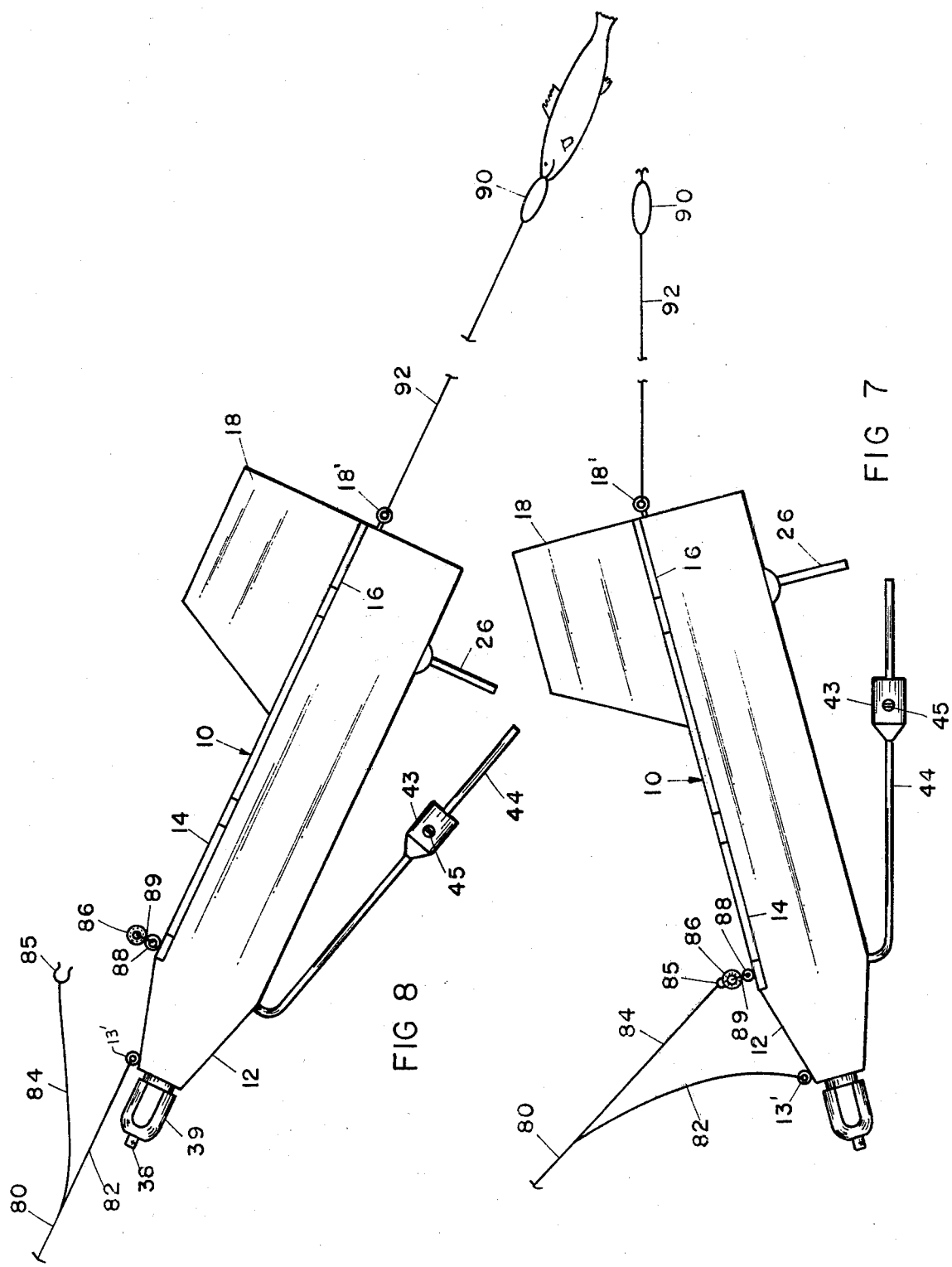

3,978,811

TROLLING DEVICE WITH PARAMETER DETECTING MEANS FOR CONTROLLING THE DEVICE

BACKGROUND OF THE INVENTION

The present invention relates to a trolling device and particularly to such a device including means for controlling the position of the device in a fluid according to a detected parameter.

A trolling device which can maintain a preselected position as a function of water depth or temperature when attached to a tow line has great utility for oceanographic research where samples of plankton, temperature, salinity, oxygen or other data can be accomplished more quickly and economically through the use of such a device. Present systems employed for such measurements utilize time-consuming procedures wherein tow line angle measurements are made and trigonometric functions are applied to such data to ascertain the position of the sensor in the water.

Alternatively, self-controlled devices such as represented in U.S. Pat. No. 3,412,704 issued Nov. 26, 1968 to P. L. Buller et al. are very complex and expensive including an array of mechanical and electrical parts for sensing the water depth and controlling diving vanes through servo control systems. When utilizing trolling devices for oceanographic research, it is desirable to gather several samples during one trolling run which requires the deployment of several devices from separate lines. The prior art systems require either considerable manpower to utilize or alternatively, several costly devices.

In addition to oceanographic research, constant depth or constant temperature trolling devices of several varieties have been suggested for the sport fisherman for maintaining a fishing lure at a predetermined water temperature or depth at which the desired species of fish is likely to be found. The use of such a device for sport fisherman, or necessity, must be less expensive than that employed in oceanographic research thereby eliminating the relatively complex and, therefore, costly systems. Several fishing devices of this type have been provided which provide for some form of lure control either responsive to depth or water temperature. Representative of known devices are U.S. Pat. Nos. 2,976,642 issued Mar. 28, 1961 to R. J. Wickman et al.; 3,583,089 issued June 8, 1971 to Carl B scarbro; 3,643,370 issued Feb. 22, 1972 to J. W. Cook; and 3,470,649 issued Oct. 7, 1969 to R. O. Cole.

In addition to these devices, U.S. Pat. No. 3,749,045 issued July 31, 1973 to Angus et al. and assigned to the present assignee discloses a pressure-responsive, constant depth trolling device in which a pressure-actuated member is coupled to a diving fin and directly applies force to change the angular position of the diving fin for maintaining the trolling device near a constant depth. In U.S. Pat. No. 3,749,045, the pressure-actuated member pushes the vane against the force of the fluid flowing past. In the present case, the force of the flowing fluid is actually utilized to move the vane to the desired position.

Although such prior art devices have provided some degree of usefulness, particularly in the sport fishing art, they have been limited to pressure- or temperature-responsive applications for controlling the position of the trolling device. An even greater deficiency in such devices is that they require a detector or additional power source which provides significant mechanical force or motion for providing the desired control function. Such limitations, of necessity, reduce the accuracy of the devices in controlling their motion through water, increase the required size and mechanical strength of the detector, increases the mechanical complexity and cost and reduces the number and scope of other applications.

SUMMARY OF THE INVENTION

The apparatus of the present invention, however, satisfies the stringent requirements of oceanographic research devices as well as those of the sport fisherman art by providing an improved trolling device in which any number of a variety of parameters can be detected and control means provide a blocking function for stopping a movable element which when in a stationary position, causes the trolling device to move in a predetermined direction, and when in a freely movable position, causes the trolling device to move in a different direction. By utilizing the detected parameter to provide relatively small control forces and movement required for blocking and unblocking a movable element as opposed to positively moving a diving vane or the like, less motion and force is required thereby permitting the utilization of a wide variety of sensitive transducers for greater precision and control.

In the preferred embodiment of such invention, the movable element comprises a freewheeling paddle wheel while the control means comprises a blocking member coupled to a parameter detector and responsive thereto for selectively unblocking the paddle wheel when the trolling device is slightly below the predetermined detected position in the fluid or blocking the paddle wheel when the device is slightly above the desired, predetermined parameter level.

These and other novel aspects and objects of the present invention can best be understood by reference to the following description thereof together with the accompanying drawings in which:

BRIEF DESCRIPTION OF THE DRAWINGS

FIG. 3 is a front view of the structure shown in FIG. 1;

FIG. 4 is a left side elevational view, partly broken away of an alternative embodiment of the present invention;

FIG. 7 is a left side elevational view of another embodiment of the present invention shown during one mode of operation; and FIG. 8 is a left side elevational view of the structure shown in FIG. 7 shown during another mode of operation.

DETAILED DESCRIPTION OF THE PREFERRED EMBODIMENT

Figure 1:
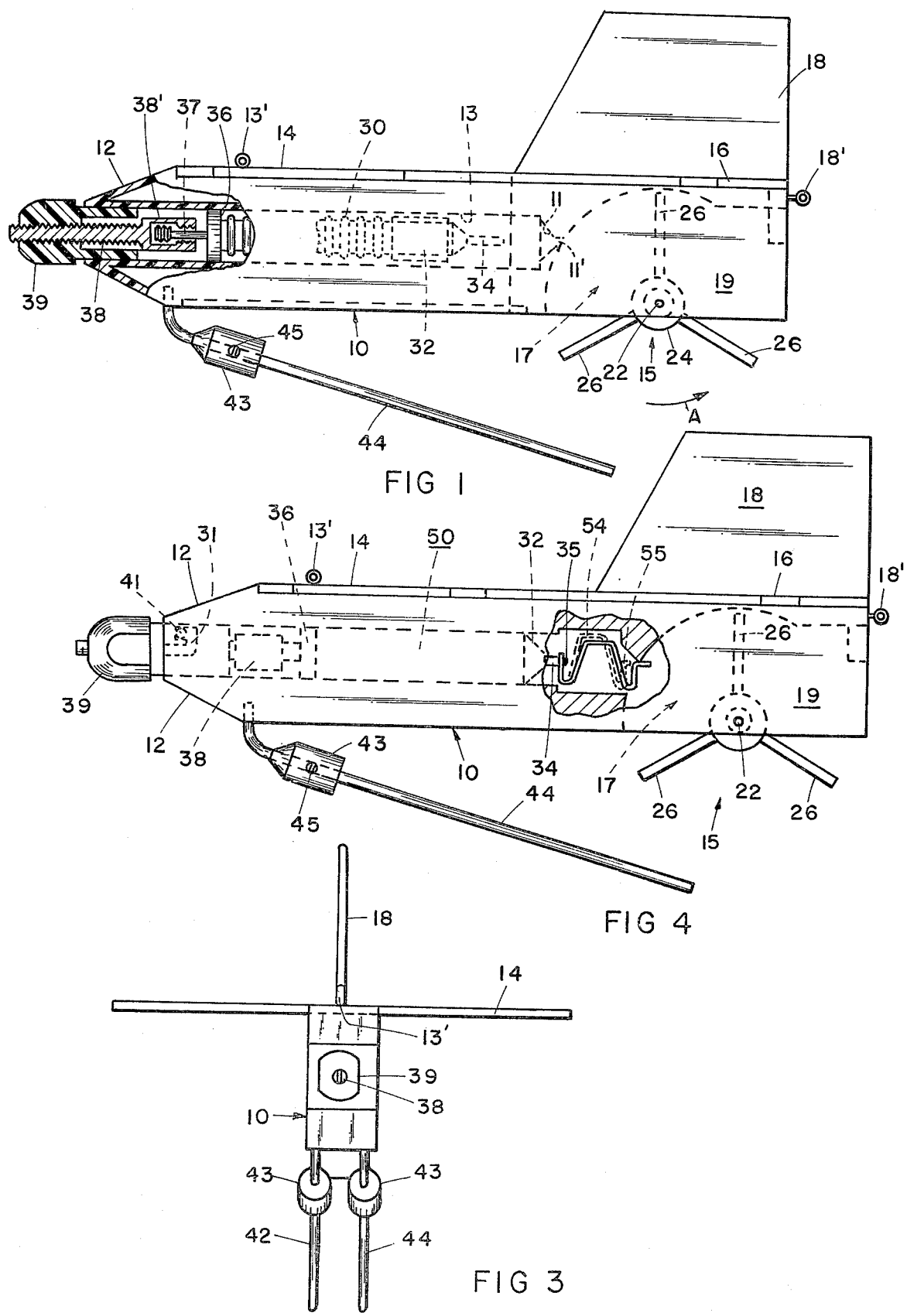
FIG. 1 is a left side elevational view partly in cross section of one embodiment of the present invention.
Figure 2:
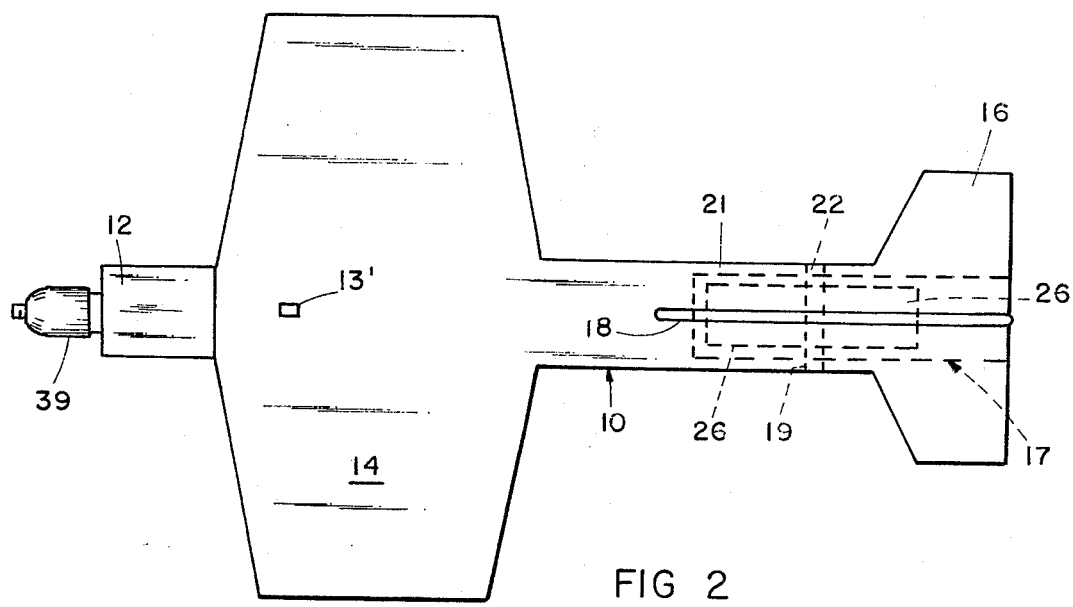
FIG. 2 is a top plan view of the structure shown in FIG. 1.

Referring now to FIGS. 1–3, there is shown a constant depth seeking device comprising an elongated rectangular body 10 having a rectangular cross-sectional configuration (FIG. 3) with an inwardly tapered nose portion 12 to provide some degree of streamlining. Integrally formed with the body is a wing 14 positioned on the top of the body near the tapered nose. Horizontally extending tail fins 16 are integrally formed with the body and extend outwardly from opposite sides thereof near the tail end. An integral vertical stabilizer 18 extends upwardly from the tail end of the body and includes an I-bolt 18' coupled to the body of the device for attachment of an object to be towed which can be scientific sample gathering apparatus, fish lures, or the like.

Extending downwardly and rearwardly from body 10 is a pair of rods 42 and 44, respectively, each including an annular weight collar 43 secured to the rods 42 and 44 by means of suitable set screws 45. Rods 42 and 44 can be pivoted with respect to body 10 to provide greater or lesser spreading of the weights 43. Weights 43 can thus be secured along the rods to effect the required stability of the device and also provide means for adjusting the device characteristics if they are changed due to damage, warpage, water adsorption or or any other cause. The rods also serve as weed deflectors and as a convenient stand for the device.

Body 10 and the various wings and stabilizing fins forming stabilizing means therefor can be machined from Lucite, waterproof plywood or can be formed by injection molding using a two-piece mold and a suitable thermoplastic material such as ABS plastic, Lexan, high impact polystyrene, or the like.

Extending into the body 10 from the nose is a cylindrical chamber 13 which, as described in detail below, houses the control means for selectively blocking a movable element during operation. The movable element comprises a paddle wheel assembly 15 in the preferred embodiment. Formed upwardly into the tail section of body 10 is a semicylindrical cavity 17 bounded by side walls 19 and 21 which support an axle 22 therebetween. Rotatably mounted to the axle 22 is a hub 24 forming part of the paddle wheel assembly 15. Extending radially outwardly from hub 24 are three rectangular, planar vanes 26 spaced at approximately 120° to define the paddle wheel. The paddle wheel rotates in a freewheeling direction indicated by arrow A in FIG. 1 when the trolling device is pulled through the fluid by means of a trolling line attached to a suitable I-bolt 13' on the leading edge of the wing and when the control means is in the position shown in FIG. 1.

The control means for selectively blocking the paddle wheel comprises a bellows 30 which can be manufactured from vacuum-formed, flexible hose and includes a tapered plug 32 at the rear end sealing the bellows forming hose at this end. Plug 32 further includes a blocking tip 34 extending rearwardly from the tapered end of the plug. Plug 32 is shaped to seat against a similarly tapered recess 11 formed in the rear end of chamber 13 with tip 34 extending through aperture 11' which communicates with housing 17. Aperture 11' permits water to enter chamber 13 through housing 17 and act upon bellows 30 and permit bellows 30, when in a fully extended position, to expand such that tip 34 extends through aperture 11' and obstructs one of the vanes 26 of the paddle wheel assembly 15 for blocking the paddle wheel with one of the vanes extending generally vertically downwardly.

The front end of bellows 30 includes a sealing closure plug 36 having a forwardly extending, threaded end 37. A stem 38 is threadably fitted through a nose plug 39 closing the front end of chamber 13. Stem 38 includes an enlarged, threaded end 38' for receiving end 37 of plug 36 providing a slip fit therebetween. Plug 39 is held in the body 10 of the device by means of a twist lock arrangement. As best seen in FIG. 4 embodiment, a pair of L-shaped slots 31 is formed in the body and communicates with the inside front end of chamber 13. A pair of short roll pins 41 is fitted into the plug from opposite sides and locks the plug in place when inserted into slots 31 and twisted.

The device is programmed to maintain itself at a constant selected depth by adjustment of stem 38 to precompress bellows 30 which typically is air-filled at atmospheric pressure but can be charged with other gases at, above or below atmospheric pressure. The bellows utilized in the preferred embodiment was a ⅝ inch diameter vacuum-formed flexible hose made of polyethylene. This type of bellows construction permits use of the device up to approximately 200 feet beyond which it is necessary to utilize metallic bellows. For great depths, the bellows are precharged with measured pressures of compressed gas for providing greater bias force against the blocking tip into the paddle wheel housing for obstructing the paddle wheel and thereby requiring greater depths before the paddle wheel is freed. Also, the device could carry a supply of pressurized gas coupled to the bellows through a differential valve for equalizing the internal bellows pressure to a predetermined depth.

In the preferred embodiment of the invention, the following parameters were found to provide constant depth trolling with the device within approximately 7% of the preselected depth. Two different sizes of the device are made although it will become apparent to those skilled in the art that the invention can be made in any desirable size with equivalent results.

| Controlled Depth | Initial Bellows Length Small Device | Initial Bellows Length Large Device |
|---|---|---|
| 0 ft. | 2 7/8 in. | 5 in. |
| 10 ft. | 2 1/2 in. | 4 1/4 in. |
| 20 ft. | 2 1/4 in. | 3 5/8 in. |
| 30 ft. | 2 in. | 3 3/16 in. |
| 40 ft. | 1 7/8 in. | 2 13/16 in. |
| 50 ft. | 1 3/4 in. | 2 5/8 in. |
| 60 ft. | 1 11/16 in. | 2 9/16 in. |
| 70 ft. | — | 2 1/2 in. |
| 80 ft. | — | 2 15/32 in. |

In the representative figures given above, the bellows length is the original length before entering the fluid as adjusted by the stem adjustment 38. The stem 38 can be suitably calibrated such that it reads depth directly in feet. Similarly, a slot can be provided along body 10 to expose the bellows for actual measurement of the bellows length. It is seen that in the larger devices with the longer bellows length, greater depth can be obtained with improved sensitivity of the device.

In operation, once the preselected depth is set and the device to be pulled through the water is attached, it is ready for entry into the water. At this time, bellows 30 will be in a fully extended position such that tip 34 extends through aperture 11' locking the paddle wheel in position. As the device is towed through the water to position any desirable apparatus attached thereto, the drag created by one of the downwardly projecting vanes 26 of the paddle wheel assembly causes the tail of the device to lift thereby dropping the nose causing diving of the device because of the water deflected by the wings 14 which causes a downward force greater than the upward pull of the towing line attached to point 13'. Once the selected depth has been reached, the bellows will retract removing tip 34 from the path of travel of vanes 26 thereby permitting forewheeling of the paddle wheel. As this occurs, the bias force of the paddle wheel acting to hold the tail of the device up is removed. Consequently, the tail drops, the wings 14 no longer deflect the water in a manner to force the device downward, and, therefore, the device rises in response to the upward pull of the towing line attached to point 13'. In such manner, the device oscillates about a narrow range around the predetermined depth until the trolling line is retracted.

To provide control of the device as a function of detected temperature, the structure shown in FIG. 4 is employed. In this device, the body construction and paddle wheel assembly is identical to that shown in the first embodiment and these common parts are identified by the same reference numerals. In place of the pressure-responsive bellows, a dowel 50 is inserted between end plugs 36 and 32 and a configurated bimetallic strip 54 is secured at one end to tip 34 by means of a screw 35. Strip 54 includes a projecting tip 55 which extends through aperture 11' to obstruct the paddle wheel motion when the device is above a predetermined temperature. The bimetallic element 54 is shown in FIG. 4 in solid lines in its extended locking position and in phantom lines in its retracted position. The bimetallic element 54 can be configurated to include a plurality of convolutions to provide the desired expansion causing the necessary motion when its temperature changes to contract for releasing the paddle wheel. The temperature at which the device is maintained is primarily a function of the bimetallic material selected and its configuration although the threshold of its actuation can be adjusted by means of the adjustable stem 38. The bimetallic material for element 54 is commercially available in flat strips suitable for this application. Snap action bimetallic elements can be substituted for the bimetallic element 54 shown in FIG. 4.

Figure 5:
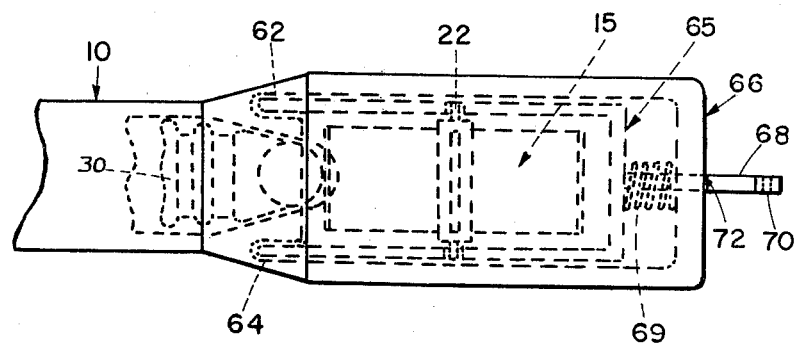
FIG. 5 is a fragmentary top plan view of a further embodiment of the present invention.
Figure 6:
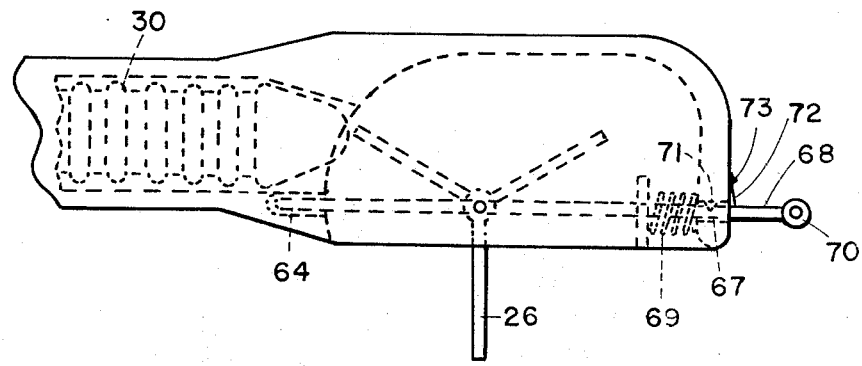
FIG. 6 is a fragmentary left side elevational view of the structure shown in FIG. 5.

An embodiment of the present invention particularly suitable for use as a fishing device without the need for a deep trolling reel is shown in FIGS. 5 and 6. This embodiment utilizes a movable paddle wheel assembly which can shift the paddle wheel rearwardly to permit its freewheeling operation even though the wheel would normally be in a stationary position due to actuation of the blocking means. In the embodiment shown in FIGS. 5 and 6, either the depth or temperature control means can be employed although the depth control means is illustrated in the figures.

In FIGS. 5 and 6, the housing 17 is modified to include a pair of guide recesses 62 and 64 for receiving the free ends of a U-shaped member 65 which supports the axle 22 of the paddle wheel assembly 15. The paddle wheel is of the same construction as previously described. In this embodiment, the end of body 10 is enclosed by a rear wall 66 including an aperture 67 therethrough through which there extends a shaft 68 coupled to the base leg of U-shaped member 65 as shown. A spring 69 biases the resultantly movable paddle wheel assembly in a normally forward position corresponding to the position of the paddle wheel as shown in FIGS. 1 and 4.

The end of shaft 68 includes a loop 70 to which a fishing lure can be attached by means of a suitable leader or the like. Shaft 68 includes a notch 71 formed downwardly therein (FIG. 6) which is engaged by a leaf spring 72 secured to the rear wall of body 10 by means of a suitable fastening screw 73.

In operation, if the device is in a diving mode, as shown in FIGS. 5 and 6, with the paddle wheel locked in position by the control means and a fish strikes the lure, shaft 68 will be pulled rearwardly against the compression of spring 69 until notch 71 aligns with the end of leaf spring 72 and locks it into position. In this position, the paddle wheel is freed from the tip 34 of the locking means such that it can be freewheeling and the fish can be more easily played and landed by the fisherman without interference from the otherwise diving device. Leaf spring 72 and notch 71 can be replaced by a suitably designed snap action plastic or metal closure.

Still a further embodiment of the apparatus of the present invention is shown in FIGS. 7 and 8 in which the device is of substantially identical construction to that shown in FIGS. 1–3 and 4 but which includes an additional releasable means for attaching the device to the trolling line. As seen in FIG. 7, a trolling line 80 forms a "Y" with a forward segment 82 securely attached to ring 13' by a suitable secure fastening means. A trailing leg 84 of the trolling line is attached to a spring releasing clip 85 in turn coupled to a pulley 86. Pulley 86 is suitably secured by means of wire or a U-clamp 89 to a second ring 88 securely attached to the body of the device near the junction of wing 14 to the tapered nose 12. As shown in FIG. 7, the device is in a diving mode of operation. If a fish strikes a lure 90 coupled to aperture 18' by means of leader 92, the impulse force of the fish striking the lure will cause the spring clip 85 to release from pulley 86 thereby causing the device to tilt upwardly due to the forward positioning of the new towing point from I-bolt 13'. This will counteract the diving effect of blocked vane 26 and permit the fish to be more easily played and retrieved when a strike has occurred.

The provision of the adjustable counterweights together with the adjustable depth control or temperature control means as well as other detectors such as salinity, light detectors, or the like through conventional transducers to provide a relatively small amount of movement requiring little force permits application of the device for a variety of uses including oceanographic research and sport fishing. It is noted here that although the device is used in one embodiment to maintain itself at a constant depth, it is understood that the depth of water or other fluid is directly related to the ambient pressure on the device and the detecting means of the device thus responds to the pressure for providing depth control. Also, as used herein, fluid refers to liquid and gaseous fluids.

It will become apparent to those skilled in the art that various modifications to the embodiments shown and described herein can be made. The particular configuration of the body of the device is not critical. Movable elements which are freely movable but which can be selectively blocked or locked other than the paddle wheel of the preferred embodiment can be employed. These and other modifications to the preferred embodiment will, however, fall within the spirit and scope of the invention as defined by the appended claims.

The embodiments of the invention in which an exclusive property or privilege is claimed are defined as follows:

1. A device for controlled movement through a fluid comprising:
   a body including means for stabilizing said body for motion through a fluid;
   a freely rotatable element rotatably coupled to said body for providing a motion-controlling force to said body when held in a stationary position but not substantially affecting the motion of said body when rotating; and
   control means for detecting a predetermined parameter and selectively preventing rotation of said freely rotatable element in response to a detected predetermined level of said predetermined parameter to cause said body to move in a selected manner.

2. A trolling device adapted for constant depth trolling comprising:
   a body including means for stabilizing said body for motion through a fluid;
   a paddle wheel rotatably coupled to said body for providing a motion-controlling force to said body when in a stationary position; and
   control means comprising pressureresponsive means coupled between said body and said paddle wheel and movable in response to the pressure of the surrounding fluid to selectively impede the rotation of said paddle wheel to control said device to move toward a preselected pressure.

3. The apparatus as defined in claim 2 wherein said pressure-responsive means includes a bellows.

4. The apparatus as defined in claim 3 wherein said stabilizing means includes stabilizer fins extending from said body and at least one weight extending from a lower end of said body and adjustable with respect to said body.

5. The apparatus as defined in claim 4 wherein said paddle wheel is mounted to the rear portion of said body for causing said device to move in a downward direction when moved through a fluid when said paddle wheel is impeded by said pressure-responsive means.

6. The apparatus as defined in claim 5 and further including means for providing adjustable precompression of said bellows to provide a selectable pressure at which said pressure-responsive means releases said paddle wheel.

7. A device for controlled movement through a fluid comprising:
   a body including means for stabilizing said body for motion through a fluid;
   a paddle wheel coupled to said body for providing a motion-controlling force to said body when in a stationary position; and
   control means comprising a thermally-responsive element coupled between said body and said paddle wheel and movable in response to surrounding fluid temperature to selectively impede the rotation of said paddle wheel to control said device to move toward a preselected temperature.

8. The apparatus as defined in claim 7 wherein said thermally-responsive element comprises a bimetallic element.

9. A device for controlled movement through a fluid comprising a body including a chamber for receiving a control means responsive to a detected ambient fluid parameter, said body including a cavity for receiving a freewheeling paddle wheel and an aperture communicating between said cavity and said chamber permitting a portion of a movable element of said control means to selectively enter said cavity and obstruct the motion of said paddle wheel as a function of said detected parameter to control the motion of said device through said fluid.

10. The apparatus as defined in claim 9 and further including adjustable weight means for stabilizing the motion of said device through said fluid.

11. The apparatus as defined in claim 9 wherein said movable element of said control means includes a pressure-responsive bellows.

12. The apparatus as defined in claim 11 wherein said bellows is fitted into said chamber and includes an end projecting into said cavity for obstructing said paddle wheel and further including means for adjustably precompressing said bellows to adjust the pressure at which said end of said bellows releases said paddle wheel for rotation.

13. The apparatus as defined in claim 9 wherein said movable element of said control means includes a thermally-responsive bimetallic element.

14. The apparatus as defined in claim 9 adapted for use in maintaining a fishing lure at a predetermined depth wherein said control means is pressure-responsive and including mounting means for movably coupling said paddle wheel in said cavity biased in a first position to be operatively positioned with respect to said portion of said moveable element, and means for coupling a lure to said mounting means for moving said paddle wheel to a second continuously freewheeling position spaced from said portion of said movable element in response to a strike on the lure.

15. The apparatus as defined in claim 9 adapted for use in maintaining a fishing lure at a predetermined temperature wherein said control means is temperature responsive and including mounting means for movably coupling said paddle wheel in said cavity biased in a first position to be operatively positioned with respect to said portion of said movable element, and means for coupling a lure to said mounting means for moving said paddle wheel to a second continuously freewheeling position spaced from said portion of said movable element in response to a strike on the lure.

16. The apparatus as defined in claim 9 adapted for use in maintaining a fishing lure at a predetermined depth wherein said control means is pressure-responsive and including means for coupling a lure to said apparatus and for coupling a towing line to said apparatus at a first position and for releasably coupling a towing line to said apparatus at a rearward position such that said releasable coupling releases when a fish strikes the lure whereby said apparatus changes attitude.

17. The apparatus as defined in claim 9 adapted for use in maintaining a fishing lure at a predetermined temperature wherein said control means is temperature-responsive and including means for coupling a lure to said apparatus and for coupling a towing line to said apparatus at a first position and for releasably coupling a towing line to said apparatus at a rearward position such that said releasable coupling releases when a fish strikes the lure whereby said apparatus changes attitude.

* * * * *